United States Patent [19]
Koenck et al.

[11] Patent Number: 5,324,925
[45] Date of Patent: Jun. 28, 1994

[54] HAND-HELD DATA TERMINAL AND COMMUNICATOR

[75] Inventors: Steven E. Koenck; Phillip Miller; Darald R. Schultz, all of Cedar Rapids, Iowa

[73] Assignee: Norand Corporation, Cedar Rapids, Iowa

[21] Appl. No.: 25,039

[22] Filed: Mar. 1, 1993

Related U.S. Application Data

[63] Continuation-in-part of Ser. No. 996,908, Dec. 28, 1992, which is a continuation-in-part of Ser. No. 951,263, Sep. 25, 1992.

[51] Int. Cl.[5] ............................................. G06K 7/10
[52] U.S. Cl. .................................. 235/472; 235/462; 235/470
[58] Field of Search ........................ 235/462, 470, 472

[56] References Cited
U.S. PATENT DOCUMENTS 5,191,197  3/1993  Metlitsky ............................. 235/472

Primary Examiner—Harold Pitts
Attorney, Agent, or Firm—Suiter & Associates

[57] ABSTRACT

The present invention discloses a hand-held terminal adapted for data gathering, data processing, and voice and data communication. Included is a housing which includes a front section having an exterior and an interior, and a rear section having an exterior and an interior, wherein the front section is hinged to the rear section. These front and rear sections may be disposed in either a linear, angular, or parallel relationship. Key means for entering information into the terminal and display means for displaying information are incorporated into the exterior of the front section. A low power frequency hopping transceiver is disposed at least partially within the housing for receiving and transmitting information via the terminal. Also included are scanning means disposed within the housing for optically reading information stored in coded information sets and battery means disposed within the housing for providing electrical power. Finally, a computer is included within the housing for processing information input and output the terminal.

12 Claims, 6 Drawing Sheets

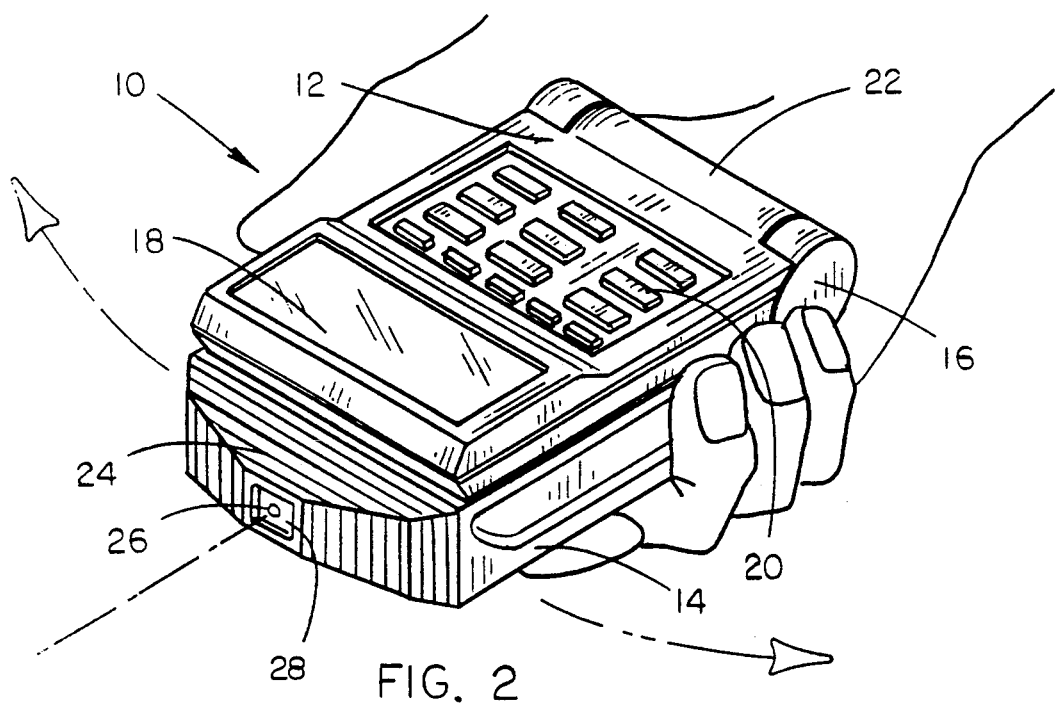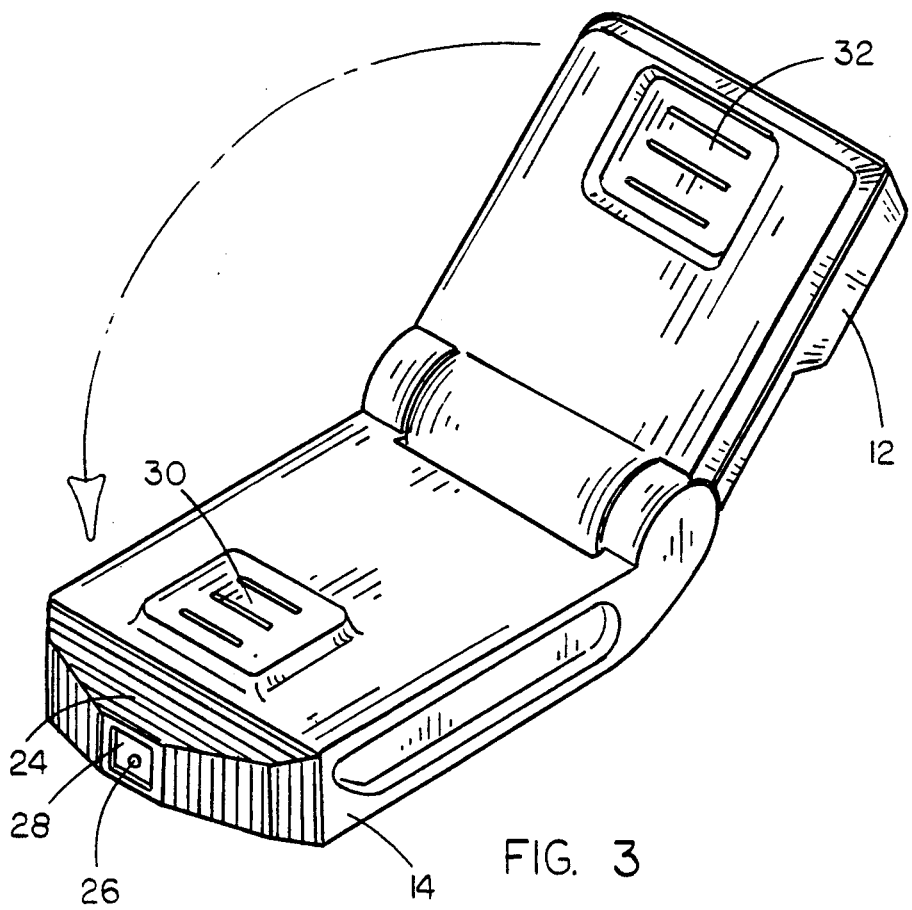

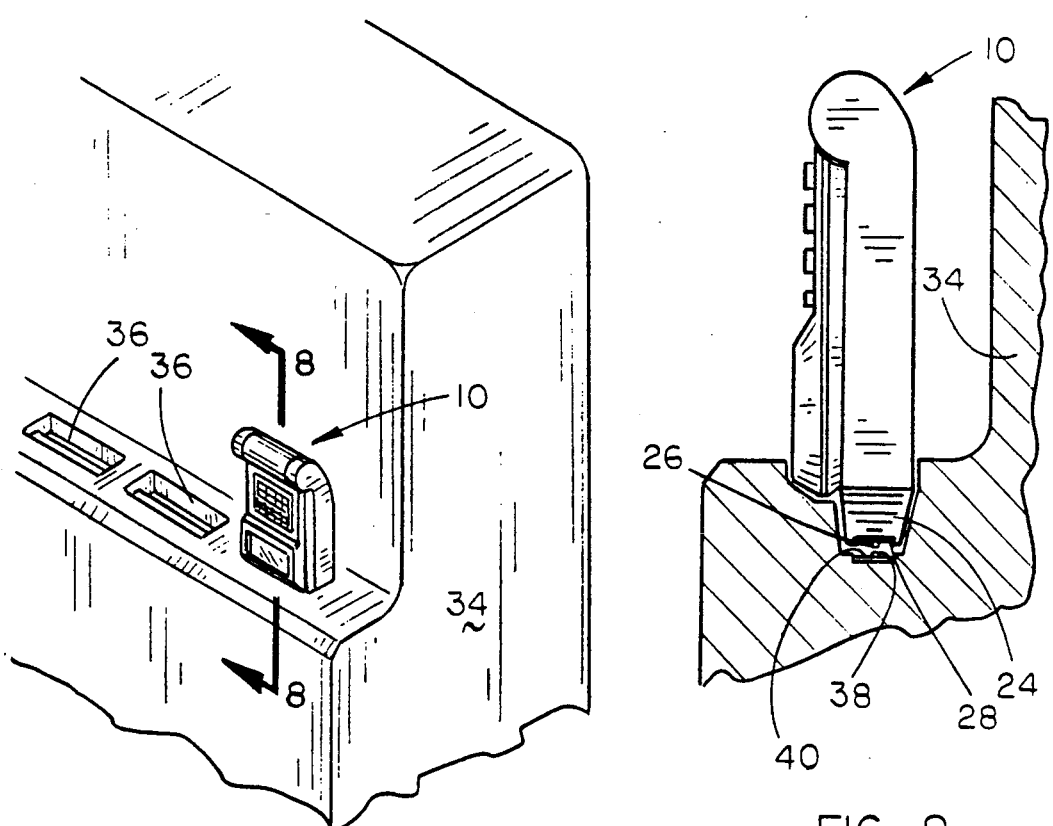
FIG. 7
FIG. 8
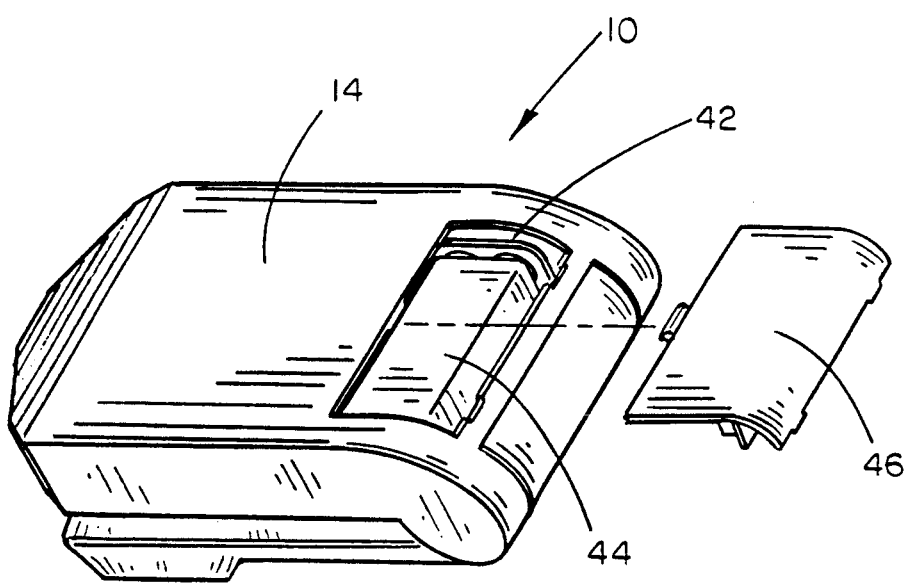
FIG. 9

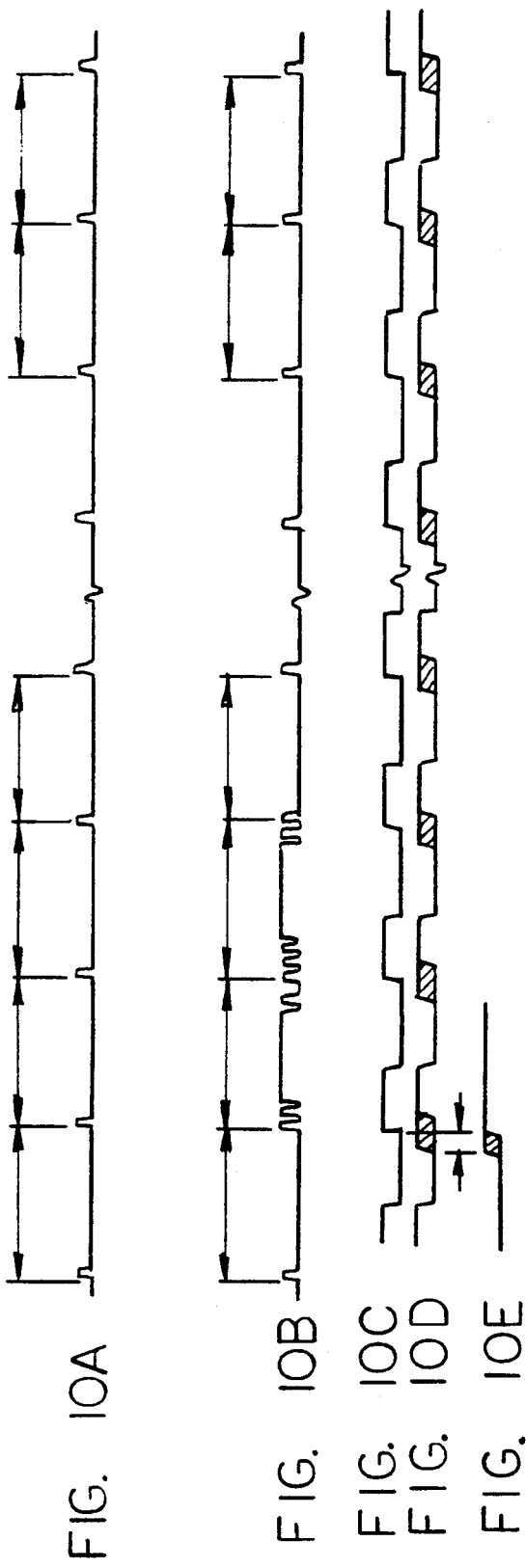

HAND-HELD DATA TERMINAL AND COMMUNICATOR

CROSS REFERENCE TO RELATED APPLICATIONS

This application is a continuation-in-part of U.S. patent application Ser. No. 07/996,908 filed Dec. 28, 1992 which is in turn a continuation-in-part of U.S. patent application Ser. No. 07/951,263 filed Sep. 25, 1992.

TECHNICAL FIELD

The present invention generally relates to hand-held data terminals and more particularly to a hand-held data terminal capable of real time voice and data communication, data collection, and data processing.

BACKGROUND ART

In the medical care industry, where medical personnel make numerous visits to individual patients, it is necessary for the personnel to ensure proper patient identification before care can commence. Further, the personnel must consult written charts to see what care has been ordered, what medication is to be administered, and what tests must be run. These personnel must then record what care has been provided, the results of the various tests, and the times and dosages of any medications which have been administered. The purpose of the present invention is to automate this procedure in an attempt to eliminate the potential for human error which is inherent in the present procedures. Various attempts at automation of some of these functions of medical personnel have been made, but with limited success because of the failure to devise an overall scheme for total automation and communication of the numerous individuals and offices involved in the total health care process.

The present invention may also be adapted for use by retailers and manufactures or the like. For example, the present invention might be utilized by customer service, sales, and warehouse employees such that customers may locate, purchase, and obtain goods more quickly.

DISCLOSURE OF THE INVENTION

The present invention, in a simple form, provides a hand-held terminal adapted for data gathering, data processing, and voice and data communication. Included is a housing which comprises a front section having an exterior and interior, and a rear section also having an exterior and interior, wherein the front section is hinged to the rear section. The first and second sections may be disposed in either linear, angular, or parallel relation.

Key means for entering information into the terminal and display means for displaying information are incorporated into the exterior portion of the front section. A low power, frequency hopping, transceiver is disposed at least partially within the housing for receiving and transmitting information via the terminal. Also included are scanning means disposed within the housing for optically reading information stored in coded information sets and battery means disposed within the housing for providing electrical power. Finally, a computer is included within the housing for processing information input and output the terminal.

As a further aspect of the present invention a long range wand type laser scanner may be incorporated such that the apparatus may be utilized to read optically readable information located at a substantial distance from the operator.

BRIEF DESCRIPTION OF THE DRAWINGS

FIG. 2 is a perspective view of the present invention in actual use;

FIG. 3 is a perspective view of the present invention in the open configuration in preparation for voice communication;

FIG. 7 is a perspective view of the invention inserted into a docking station;

FIG. 8 is a sectional view of the invention showing the invention inserted into the docking station;

FIG. 9 is a rear perspective view of the invention with the battery cover removed; and FIGS. 10A–10E and 11A–11C are a diagrammatic illustration of an exemplary frequency hopping synchronization schema and process for use in the voice and data communication portion of the present invention.

BEST MODE FOR CARRYING OUT THE INVENTION

Figure 1:
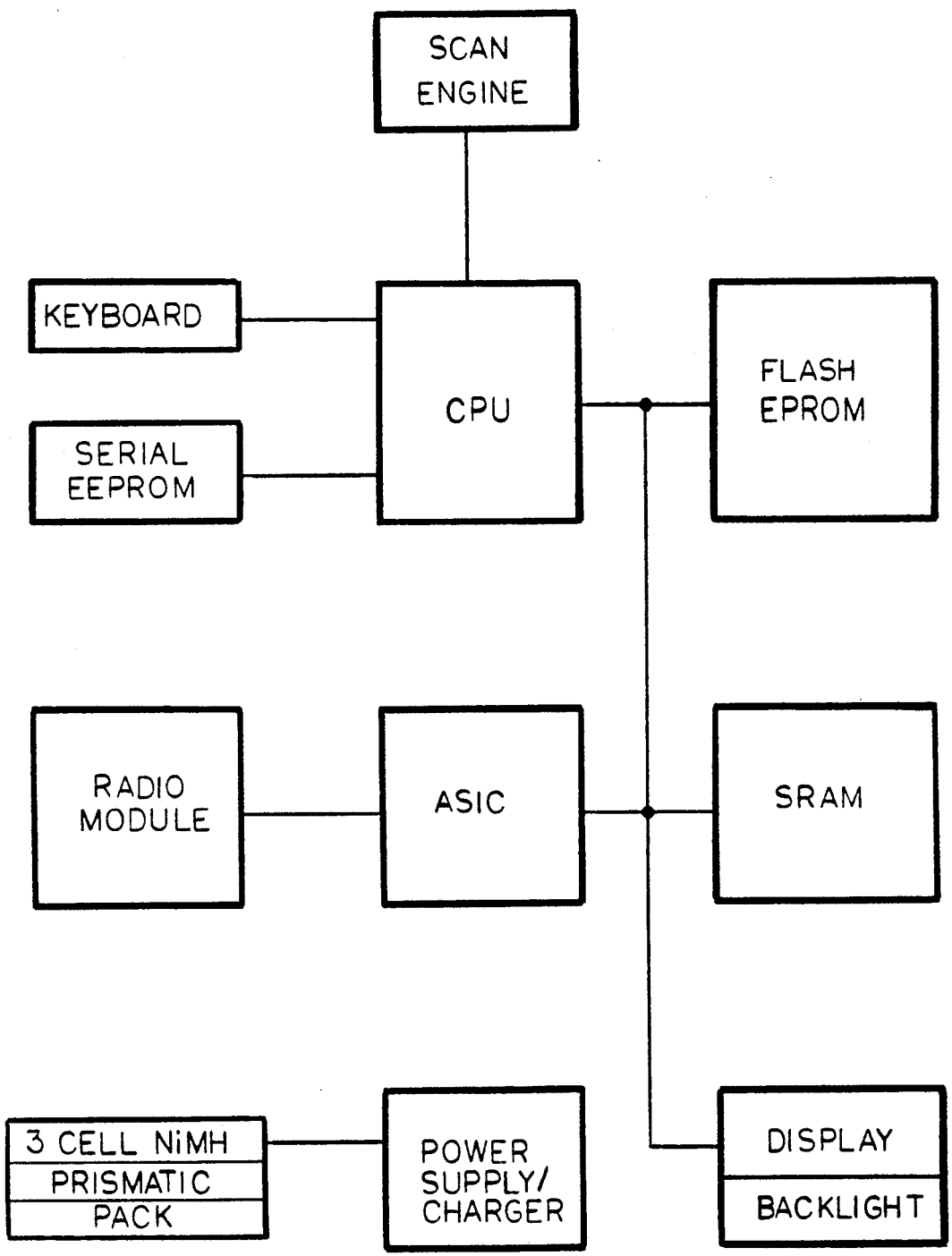
FIG. 1 is a block diagram illustrating the various components of the present invention.
Figure 4:
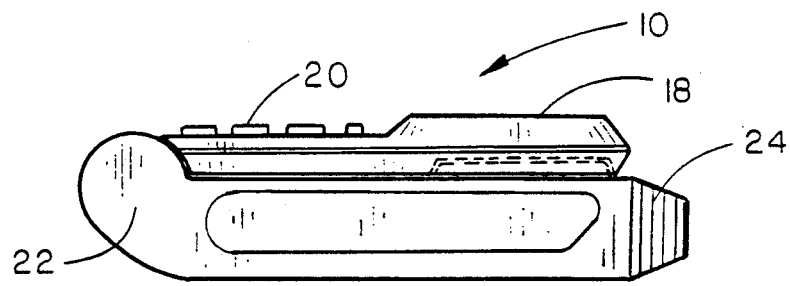
FIG. 4 is a right side elevational view.
Figure 5:
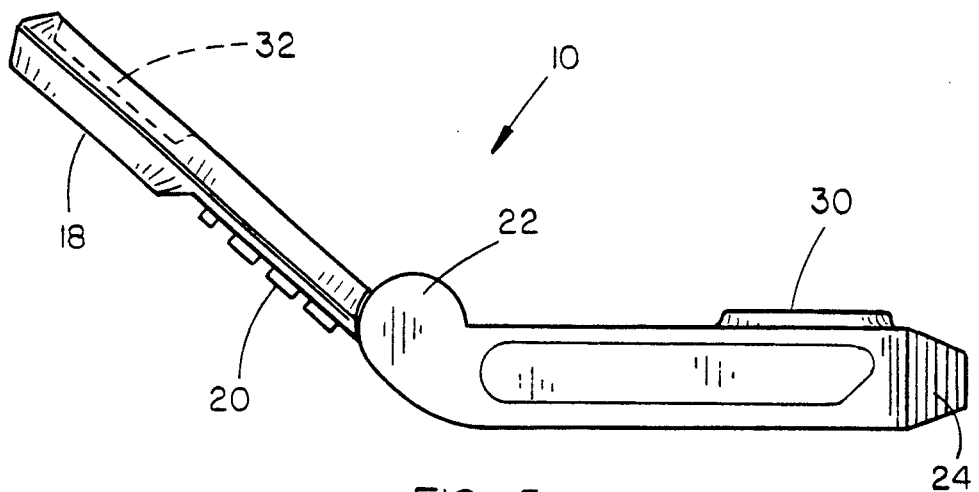
FIG. 5 is a right side elevational view with the invention in the open, voice communication configuration.
Figure 6:
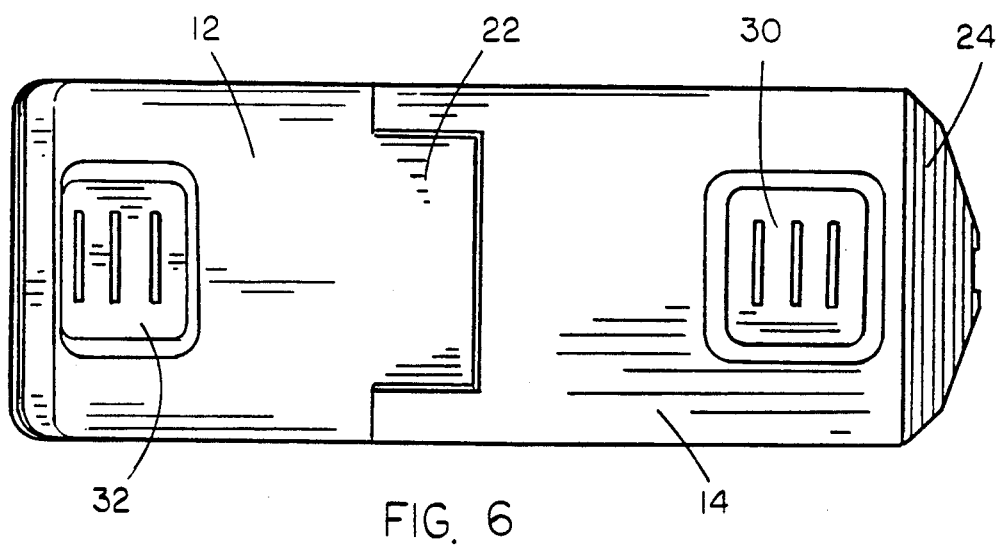
FIG. 6 is a top planar view of the invention in the open, voice communication configuration.
Figure 11A:
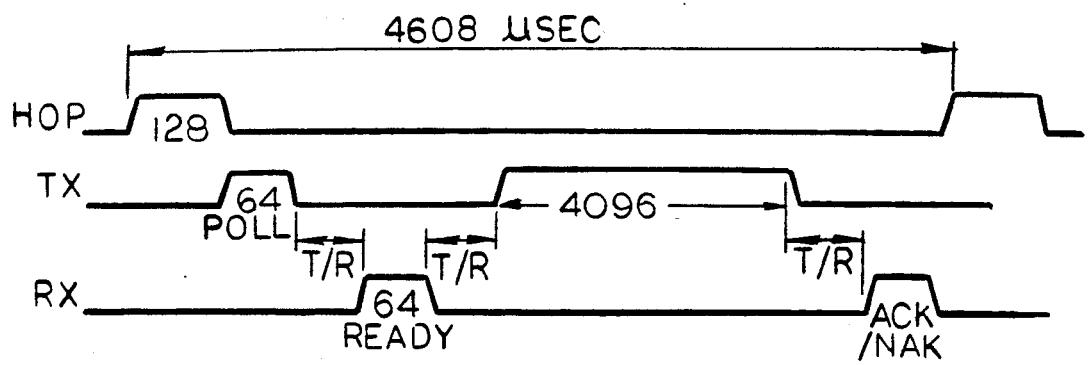
Figure 11B:
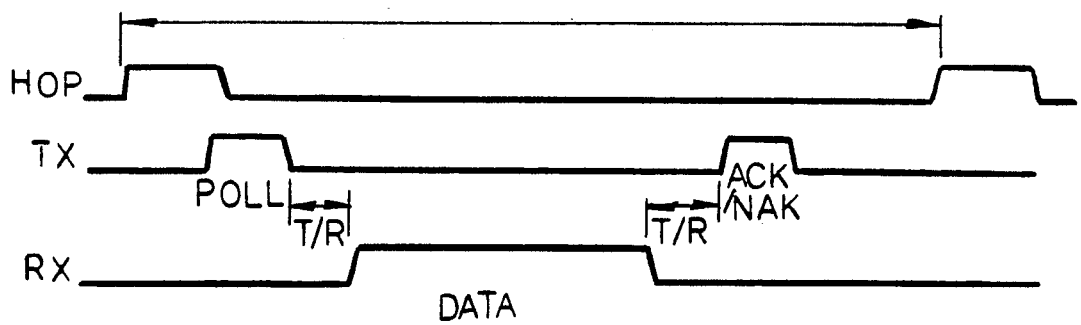
Figure 11C:
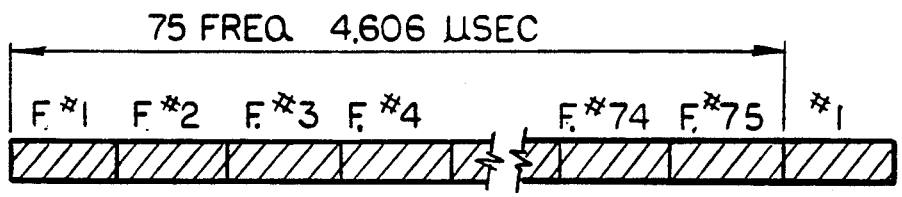

The present invention, in an exemplary embodiment 10, includes a front section 12 hinged to a rear section 14 by a joint 16. Provided on the upper surface of the front section 12 is a display 18 and keypad 20. A user may manually input data via said keypad 20 such that said data may be stored or transmitted to a remote transceiver for processing.

Turning now to FIG. 1, a diagrammatic illustration is provided wherein the important components of an exemplary embodiment and their relationship is shown. In operation, data may be input into the terminal 10 for processing via a scanner module 24, keyboard means 20, or a serial E²PROM (a touch screen or pen based stylus screen may also be utilized). Such data may be manipulated and processed according to standard algorithms suitable to the desired functions and features of the apparatus 10. The processed information may be output from the central processing, for example, to a flash EPROM where said data may be stored in a SRAM or transmitted via a frequency hopping, low power, radio transmitter 22.

The apparatus 10 may include, in an exemplary embodiment, a three cell nickel metal hydride prismatic battery pack 44 (a Motorola Micro Tak battery pack might also be utilized). Likewise, stored, processed, or manipulated data may be displayed on the display 18 such that a user of the apparatus 10 may be notified of certain results, messages or needed inputs.

Turning now to FIG. 2, the apparatus of an exemplary embodiment 10 is shown in a user's hand such that the scanner module 24 may be operated. In an exemplary embodiment a long range laser wand scanner is employed. The scanner module 24 is adapted to read optically readable information over a substantial range of distances. The module 24 includes a laser light source 26 (such as a VLD or the like) and a detector 28. In operation, a user may simply activate the scanner via a switch or other means such that the visible light beam produced by the laser light source 26 may be manually scribed over a bar code or the like. The user may be notified via the display 18 when an accurate read has been obtained.

FIG. 3, 4, 5, 6, 10A-E, and 11A-C illustrate the voice communication feature of an exemplary embodiment 10 of the present invention.

A preferred embodiment of the present invention would use the GEC Plessey FH radio for radio frequency communications at 1 Mbps. As may be seen in FIG. 11A, a data rate of 888,889 bits per second may be obtained using a hop schedule of 217 hops per second, with each hop allowing the transfer of 512 bytes of information. Given this high net data throughput capability, it is also possible to provide voice communication capability. One approach is 8K sample, 8 bit FCM which nets 64,000 bps data rates. Data compression techniques would allow this to be reduced to as low as 8,000 bps, although a more appropriate net rate would be estimated at 16,000 bps. Assuming a maximum data rate potential of 800,000 bps, derating to 25% of that rate, or 200,000 bps, would yield 12 effective voice channels (200,000/16,000). Such a capability would provide secure voice communications, broadcast or selected terminal communications, and telephone interconnect for data and voice transmissions.

Of course, while data may be transmitted digitally via the radio module 22, data may also be communicated between the terminals, of an exemplary embodiment 10, via a docking station 34, having a plurality of docking ports 36. In a preferred embodiment the laser light source 26 and detector 28 of the terminal 10 may be utilized to transmit and receive data between the terminals 10 and a docking station 34. This may be accomplished via a laser light source 38 and detector 40 mounted in the docking ports 36 of the station 34 (FIGS. 7 & 8).

Finally, turning to FIG. 9, the terminal 10 may be powered by a removable, rechargeable battery pack 44. In an exemplary embodiment nickel-metal-hydride batteries are employed. As illustrated by FIG. 9 the battery pack 44 may be electrically connected to the terminal upon insertion of the pack 44 into a battery compartment 42. The battery pack 44 may be secured in the compartment 42 via a battery compartment cover 46.

Whereas, the present invention has been shown and described in connection with a preferred embodiment thereof, it is apparent that many modifications, additions and substitutions may be made which are within the intended broad scope of the appended claims. For example, chip-on-board (COB) technology may be employed to assist in miniaturization of the terminal.

We claim:
1. A hand-held portable terminal, comprising:
 (a) a housing having a front section and a rear section, a forward end and a rearward end, said front section being hinged to said rear section;
 (b) key means disposed within said housing for entering information into said terminal;
 (c) display means disposed within said housing for displaying information;
 (d) a low power, frequency hopping, transceiver means disposed at least partially within said housing for receiving and transmitting information by said terminal;
 (e) scanning means disposed within said housing for optically reading information stored in coded information sets;
 (f) battery means disposed within said housing for providing electrical power thereto; and
 (g) means, disposed within said housing, for processing information input and output said terminal.

2. The hand-held portable terminal of claim 1, wherein said scanning means includes a long range wand type laser scanner.

3. The hand-held portable terminal of claim 2, wherein said low power frequency hopping transceiver means further comprises voice communication means.

4. The hand-held portable terminal of claim 3, wherein said battery means is at least one nickel metal hydride cell.

5. The hand-held portable terminal of claim 3, wherein said voice communication is digitized and compressed before transmission.

6. A hand-held portable terminal, comprising:
 (a) a housing having a front section and a rear section, a forward end and a rearward end, said front section being hinged to said rear section;
 (b) a keypad disposed within said housing for entering information into said terminal;
 (c) a display disposed within said housing for displaying information;
 (d) a low power, frequency hopping, transceiver disposed at least partially within said housing for receiving and transmitting information by said terminal;
 (e) at least one of a scanner and a bar code reader disposed within said housing for optically reading information stored in coded information sets;
 (f) a battery disposed within said housing for providing electrical power thereto; and
 (g) a computer, disposed within said housing, for processing information input and output said terminal.

7. The hand-held portable terminal of claim 6, wherein said at least one of a scanner and a bar code reader includes a long range wand type laser scanner.

8. The hand-held portable terminal of claim 7, wherein said low power frequency hopping transceiver further comprises voice communication means.

9. The hand-held portable terminal of claim 8, wherein said voice communication means is a telephone operating as a frequency hopping transceiver.

10. The hand-held portable terminal of claim 8, wherein said battery is at least one nickel metal hydride cell.

11. The hand-held portable terminal of claim 8, wherein said voice communication is digitized and compressed before transmission.

12. The hand-held portable terminal of claim 1, wherein said display may be utilized for data input via touch or stylus means.

* * * * *